United States Patent [19]

Mottate

[11] 4,426,119
[45] Jan. 17, 1984

[54] BALL BEARING SLIDE UNIT FOR LINEAR MOTION

[75] Inventor: Tatsuo Mottate, Yokohama, Japan

[73] Assignee: Nippon Thompson Co., Ltd., Tokyo, Japan

[21] Appl. No.: 294,764

[22] Filed: Aug. 20, 1981

[30] Foreign Application Priority Data

Apr. 20, 1981 [JP] Japan ............................ 56-56977[U]
Jun. 26, 1981 [JP] Japan ................................ 56-100102

[51] Int. Cl.³ ............................................ F16C 29/06
[52] U.S. Cl. ..................................... 308/6 C; 308/3 R
[58] Field of Search ............... 308/6 C, 6 R, 3 A, 198

[56] References Cited

U.S. PATENT DOCUMENTS

| | | | |
|---|---|---|---|
| 3,311,426 | 3/1967 | Binns | 308/6 C |
| 3,552,806 | 1/1971 | Weasler et al. | 308/6 C |
| 3,940,186 | 2/1976 | Nilsson | 308/6 C |
| 4,040,679 | 8/1977 | Teramachi | 308/6 C |
| 4,253,709 | 3/1981 | Teramachi | 308/6 C |
| 4,273,389 | 6/1981 | Takai | 308/6 C |

*Primary Examiner*—John M. Jillions
*Assistant Examiner*—Thomas R. Hannon
*Attorney, Agent, or Firm*—Trexler, Bushnell & Wolters, Ltd.

[57] ABSTRACT

A ball bearing for linear motion which is mounted on a track rail having track surfaces. The slide unit includes a body which is provided with track surfaces, ball return holes, and direction changing paths, and thereby, forming circulating paths where groups of balls endlessly circulate supporting a load and rolling between both track surfaces. The slide unit is characterized in that the external contours of track end retainers which form part of the direction changing paths which connect the track surfaces to the return holes and the external contours of side plates which form the direction changing path together with the track end retainers are made so as to be large circular shape in general, and that the portion providing the direction changing paths which connect to the return holes project outwardly in an upwardly inclined direction forming circular ear like shapes, thus providing a bear head like contour. A mounting hole for fastening an attached body fixedly on the slide unit is formed with a female thread portion located at the upper part of the hole and formed with a cylindrical guide surface located at the lower part of the hole with sufficient length to accurately and securely fit, guide and hold a mounting bolt from the bottom. The top surface of the slide unit is finished for mounting and the bottom surface around the mounting hole is counterbored to be a regulating surface for mounting.

3 Claims, 17 Drawing Figures

BALL BEARING SLIDE UNIT FOR LINEAR MOTION

BACKGROUND OF THE INVENTION

(1) Field of the Invention

The present invention relates to a ball bearing slide unit for linear motion wherein said slide unit is mounted on a track rail of rectangular cross section. The track rail is provided with symmetrical linear track surfaces at both vertical side surfaces, and the slide unit is provided with track surfaces opposing said track rail track surfaces and has linear return holes running parallel to said track surfaces, coupled with direction changing paths which connect both ends of said track surfaces and said return holes, and is further formed with circulating paths where a group of balls endlessly circulate while supporting a load and rolling between said both track surfaces.

(2) Description of Prior Art

Figure 14:
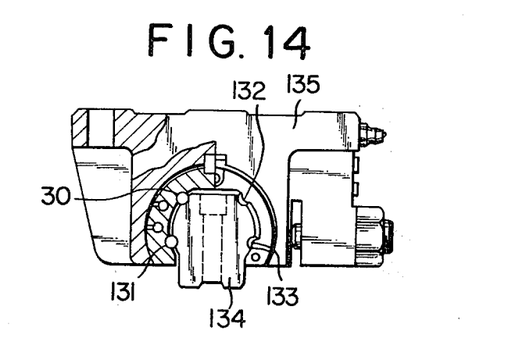
FIG. 14 is a front view including a partial cross section showing an example of prior art.

In a prior art ball bearing unit for linear motion as shown in FIG. 14, 4 sets of circulating paths 130, 131, 132, 133 for groups of balls were provided at left, right, upper and lower sides, and thus, the height and width of the slide unit 135 was large compared with the track rail 134, and also cost was high, and therefore there was a demand for a more compact slide unit.

Figure 15:
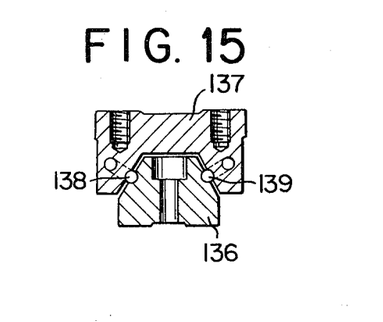
FIG. 15 is a cross sectional view of another example of prior art.

In another prior art example, as shown in FIG. 15, slide unit 137 is mounted on the inclined side surfaces of the track rail of trapezoidal shape. The circulating paths were reduced to two sets, as shown by 138, 139. Thus the compactness of the slide unit 137 was achieved. However, although said slide unit 137 can support a downward load from above without trouble, it is not usable for an upward load from below such that will raise the slide unit 137, and thus, there was a limitation to its application.

Figure 16:
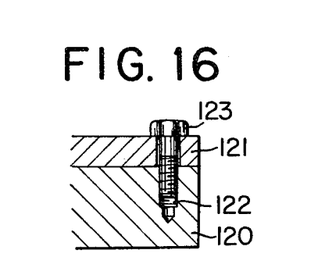
FIG. 16 is a partial cross sectional view showing the mounting construction of top fastening of an example of prior art.
Figure 17:
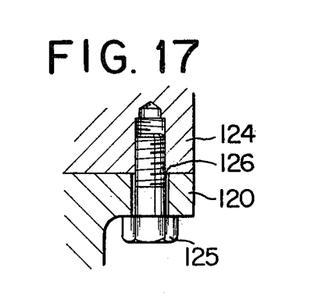
FIG. 17 is a partial cross sectional view showing the mounting construction of bottom fastening of another example of prior art.

Also, as shown in FIG. 16, when mounting the attached body 121 on the prior art slide unit, the top surface of the slide unit 120 was finished so as to serve for the mounting surface. and Female threaded bores 122 were provided at accurate required positions on said top surface for fastening the attached body 121. The construction was the so-called top fastening one which allowed fastening of bolts 123 from above the slide unit 120. When it was required to fasten the attached body 124 from below the slide unit 120, as shown in FIG. 17, guide holes 126 were provided at accurate required positions to guide and fit bolts 125 from below, the bolts being threaded aligned female threaded bores in said body 124, resulting in a bottom fastening arrangement. Thus, for bolt fastening from either above or below, it was necessary to drill the respective bolt holes separately at accurate positions. If an attempt was made to provide a ball bearing capable for both top fastening and bottom fastening, the number of machining operations increased and the size of the slide unit increased in proportion to the increase in the number of drilling positions, and as a result, the entire size of the attached body including the slide unit 120 became large, and this was contrary to the demand for a smaller and a lighter slide unit.

To avoid the above disadvantage, it was necessary to manufacture two kinds of slide units, one having female threads for top fastening and the other having bolt guide holes for bottom fastening, said female threads and said guide holes being at the same positions for the same type slide unit. This caused an increase in stock and an increase in cost, and a solution for this situation was desired.

SUMMARY OF THE INVENTION

A novel ball bearing slide unit for linear motion is provided by the present invention in which said slide unit is mounted on a track rail of rectangular cross section which is provided with linear track surfaces symmetrically at both vertical side surfaces, and is provided with track surfaces opposing said track surfaces on said track rail. Linear return holes run parallel to said track surfaces, and direction changing paths connect both ends of said track surfaces and said return holes respectively. Balls endlessly circulate through said holes and track surfaces and support a load while rolling between said track surfaces. Track end retainers make contact externally with the opposite ends of the track surfaces of the track portion provided symmetrically at the channel shaped inner surface of slide unit body and of the return holes and form part of the direction changing paths which connect said track surfaces to said return holes. The external contours of side plates which make contact externally with said track end retainers and which form said direction changing paths together with said track end retainers are made so as to be a large circular shape in general. The portions providing the direction changing paths which connect to said return holes are projecting outwardly in an upwardly inclined direction forming circular ear like shapes, and thus providing a bear head like contour. A mounting hole drilled on the slide unit for fastening an attached body fixedly on said slide unit is formed with a female thread portion located at the upper part of the hole and is formed with a cylindrical guide surface located at the lower part of the hole with sufficient length to accurately and securely fit, guide and hold a mounting bolt from the bottom, and the top surface of the slide unit being finished for mounting and the bottom surface around the mounting hole being counterbored to be a regulating surface for mounting.

The slide unit of the present invention may also be characterized in that the track portions provided at the channel shaped inner surfaces of the slide unit body consist of a pair of track plates which are separate from the body, are formed with track surfaces, and are fitted into the body symmetrically at said inner surfaces with said track surfaces facing inward.

Thus, the present invention aims to reduce the machining cost and the material cost as much as possible by reducing the height and width of the slide unit, and moreover, to provide a highly precision slide unit by properly disposing the constructional members as well as by proper construction.

The present invention also relates to an improvement in the mounting holes of the slide unit for fastening the attached body which is to be fixedly mounted on the slide unit, and thus another object of the present invention is to provide a slide unit having a mounting construction capable of fastening the attached body either from the top or from the bottom of the slide unit according to the shape of the attached body.

DETAILED DESCRIPTION OF THE EMBODIMENT

As shown in FIG. 1 through FIG. 4, one of the embodiments of a ball bearing slide unit 2 for linear motion of the present invention is mounted on a track rail 1 having a rectangular cross section, and is capable of supporting both the upward load and the downward load through a group of balls 3 which roll on track surfaces 4, 5. Track surface 4 has a half cylindrical shape and is provided at both sides 6, 6, of said track rail 1. Track surface 5 has a half cylindrical shape and is provided on a track plate 16 which is fitted into the inner side surface 7 of slide unit body 15 of the slide unit 2, and faces towards said track surface 4.

So as to support both the upward and the downward loads, and in order to impose a pre-pressure between track surfaces 4, 5 and the balls 3 at said both sides, a pre-pressure bolt 19 is screwed in, which imposes a pre-pressure in the horizontal direction through plug 18 on the back surface of at least one of the track plates 16. Further, in order to impose the required pre-pressure along the entire length of the track plate 16, a plurality of said pre-pressure bolts are provided (in the example shown in FIG. 1, three pre-pressure bolts are provided).

Figure 1:
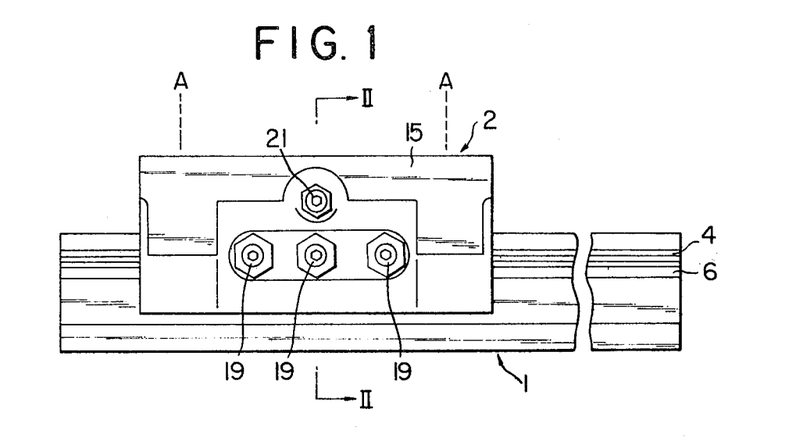
FIG. 1 is a side view of the embodiment of the present invention.
Figure 2:
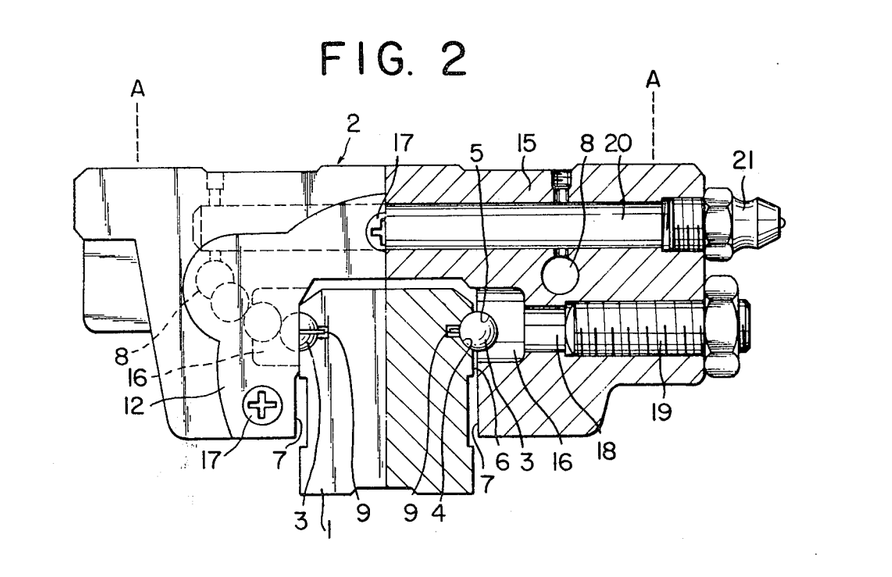
FIG. 2 is a front view in which the right half portion is shown by a cross section taken along line II—II of FIG. 1.

As shown in FIG. 2, at a position directly above and away from the position where said pre-pressure bolt 19 is screwed in, a return hole 8 which runs parallel to the track surface 5 is drilled in the slide unit body 15 at an outward upper position relative to said track surface 5. Also at a position directly above and perpendicular to said return hole 8, 8 drilled at left and right symmetrically, lubrication hole 20 is drilled laterally across and substantially at the center of the slide unit body 15 for lubricating the balls 3 rolling inside the return holes 8, 8, and grease nipple 21 is screwed in at its end.

Figure 3:
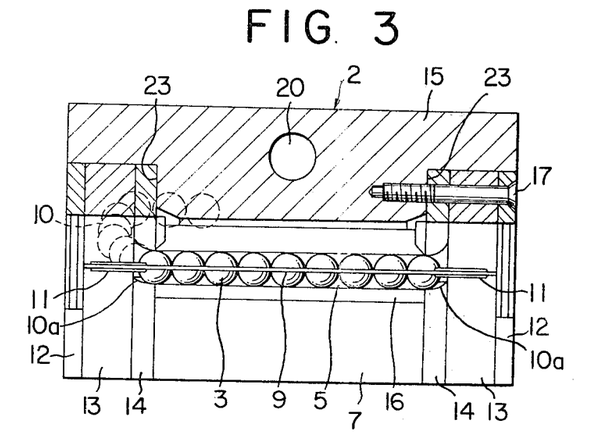
FIG. 3 is a central vertical cross sectional view taken along the direction of movement of the slide unit.
Figure 4:
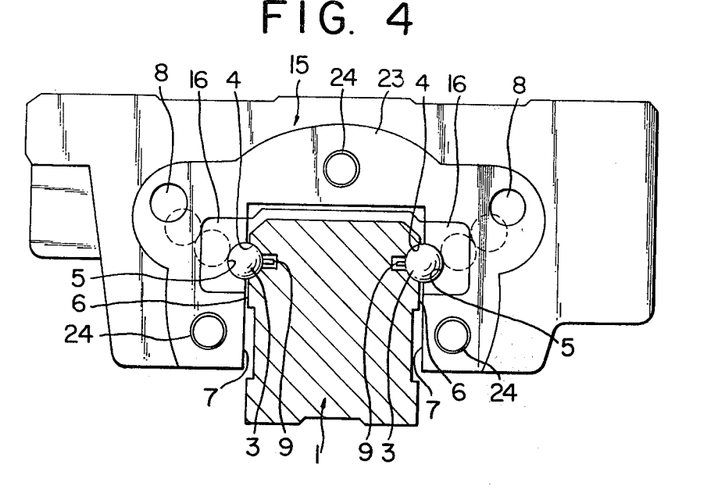
FIG. 4 shows a cross sectional view of the track rail and a front view of the slide unit body with seal, side plate and track end retainer removed.
Figures 5, 6:
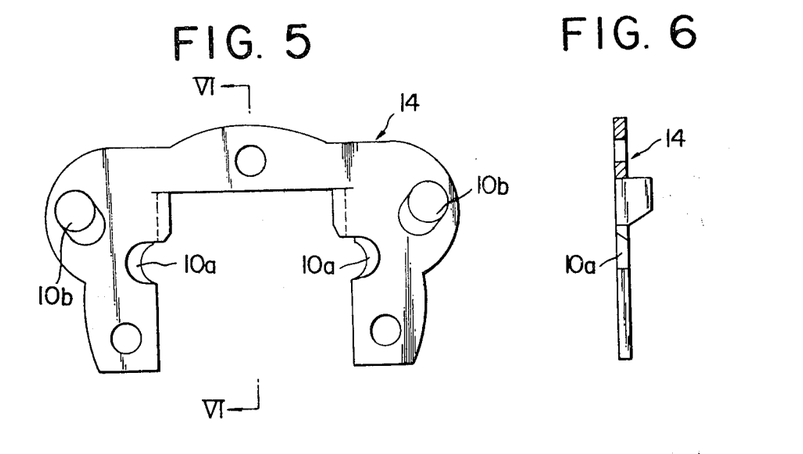
FIG. 5 is a front view of the track end retainer.
FIG. 6 is a cross sectional view taken along line VI—VI of FIG. 5.

As shown in FIG. 3, at both ends of the track plate 16, track end retainer 14, side plate 13 and seal 12 make contacts in that order and are fitted into the mounting recess provided at both ends of the slide unit body 15, and are fastened by a plurality of set screws 17, 17 at said mounting recess 23.

In the embodiment shown in FIG. 2, FIG. 4, FIG. 5 and FIG. 6, the fastening positions of said set screws 17 are provided at three places, on central top, lower left and lower right which are away from the mounting positions of other members and which do not give any trouble for fastening. However, in case of large size ball bearing for linear motion, more than three places can be provided as required.

As shown in FIG. 2 through FIG. 7, on said track end retainer 14 and side plate 13, direction changing path 10 is provided which allows connection between both ends of the track surface 5 which is the load zone of balls 3 and the return hole 8 which is the no load zone respectively. Thus, by said track surface 5 and said return hole 8 which are both linear paths, together with said direction changing paths 10, 10, which are provided at both ends of said linear paths, a circulating path in which the group of balls circulate endlessly is constructed.

Said direction changing path 10 is constructed as follows: Namely, it is constructed by short direction changing path portions 10a provided on the track end retainer 14 which when assembled connect to said track surfaces 5, 5, by short direction changing path portions 10b provided on the track end retainer 14 which when assembled connect to said return holes 8, 8, and by direction changing path main portions 10c provided on the side plate which when assembled connect to said direction changing paths 10a and 10b. Further, this direction changing path main portion 10c constitutes most portion of the spatially circularly curved surface of the direction changing path 10.

Figure 7:
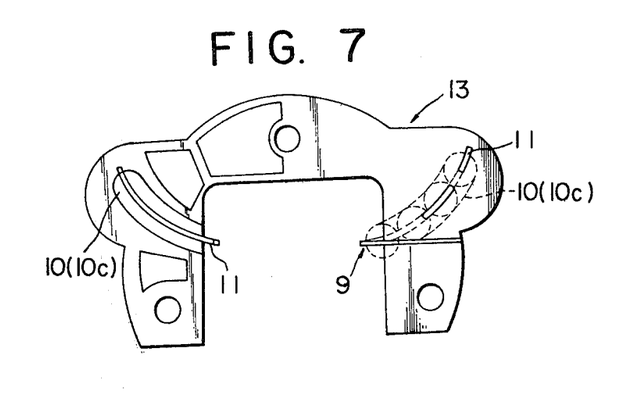
FIG. 7 is a rear and a front view of the side plate in which the left half portion shows the rear side and the right half portion shows the front side.

The direction changing path of such construction has generally a shape of spatially circular curve. The shape projected on a plane including the axes of the track surface 5 and the return hole 8 is substantially a half circularly arched surface, so that the direction change of the ball can be made smoothly. Also, as shown in FIG. 7, the shape projected on a plane perpendicular to the axis of the track rail 1 is a partially circular arc so as to connect the return hole provided at the upper side of the slide unit body 15 of the slide unit 2 and the track surface 5 provided at the lower side of said slide unit body 15 with a smooth curve, and in particular, the portion where connecting the track surface 5 is made horizontally, and thus the construction is made so as to make a smooth direction change of the balls 3.

Figure 8:
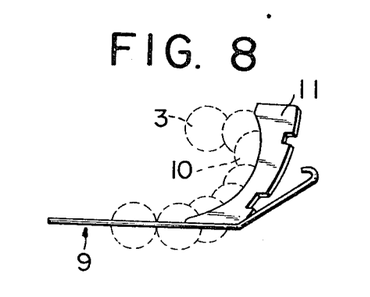
FIG. 8 is a perspective view showing the positional relationship between the guide plate, the ball retainer and the group of balls.
Figure 9:
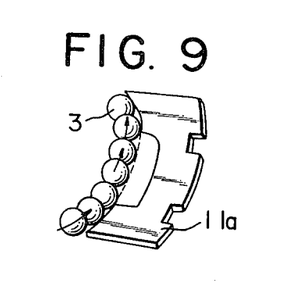
FIG. 9 is a perspective view showing the relationship between the guide plate of another shape and the group of balls.
Figure 10:
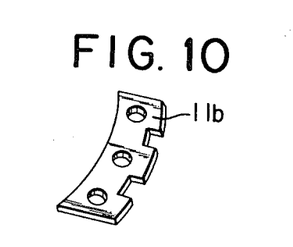
FIG. 10 is a perspective of the guide plate of still another shape.

At the position of the direction changing path main portion 10c of said side plate 13 where the balls 3 roll with most intense contact, a steel guide plate 11 is provided, the inner edge of said guide plate being formed with a surface which coincides with the curved surface of said direction changing path 10 having the shape of spatially circular curve. As shown in FIG. 9 and FIG. 10, the guide plates having shapes that will give more rigidity with combination of the side plate 13 may also be used. Also as shown in FIG. 2 and FIG. 3, at the outside center of the track surface 5, ball retainer 9 of wire shape is mounted parallel to the track surface 5 and close to the group of balls 3. The assembled positional relationship between said guide plate 11 and said ball retainer 9 is as shown in FIG. 8.

In order to allow the machining operation of the end mill to be easy and fast, the shape of the mounting recess 23 of the slide unit body where the track end retainer 14 and the side plate 13 are fitted, is generally made in a large circular shape including the position of mounting thread hole 24 of the set screw 17, and the portion including the return hole 8 and the direction changing path is made in a small circular shape which projects outwardly and upwardly in an ear like shape. Thus, the outer contours of the track end retainer 14, side plate 13 and seal 12 which fit into the mounting recess 23 are all somewhat like a bear head contour having a large circular shape with a small circular shape projecting outwardly and upwardly at both sides, thus being economically made from the strength point and being easy to manufacture.

Figure 11:
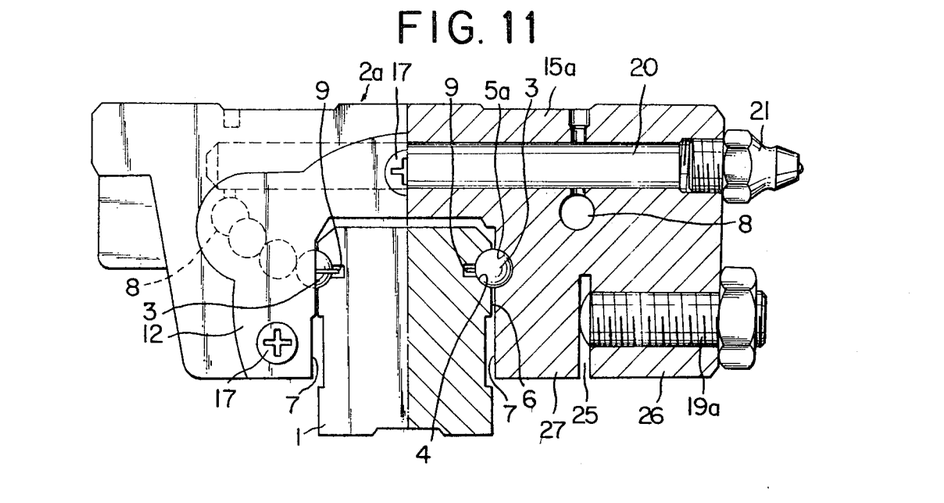
FIG. 11 is a front view of the slide unit of another embodiment, in which the right half portion is shown by a cross section.
Figure 12:
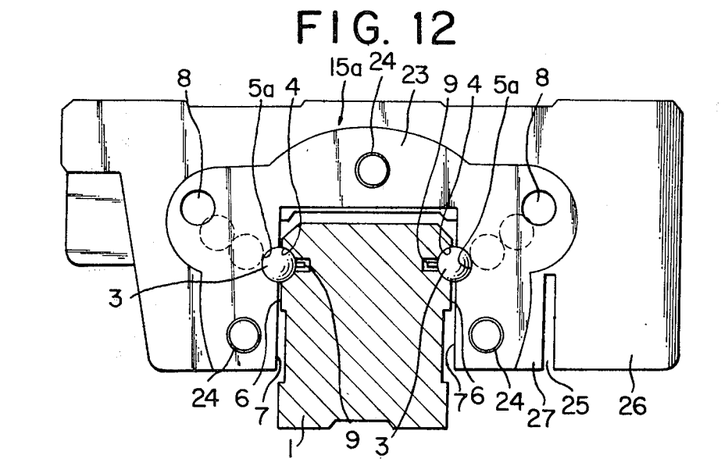
FIG. 12 shows a cross sectional view of the track rail of above and a front view of the slide unit body with seal, side plate and track end retainer removed.

In another embodiment of the slide unit 2a as shown in FIG. 11 and FIG. 12, which differs from the previously described embodiment, no track plate 16 which is separate from the slide unit body 15 is provided, and instead, at the inner surface 7 of slide unit body 15a, a half cylindrical shape track surface 5a is directly formed. Also in this embodiment, in order to impose a pre-pressure between track surface 4 of track rail 1, said track surface 5a and balls 3, there is provided, at least at one side of the lower portion of the slide unit body 15a, and toward the inner surface 7 thereof, track portion 27 which is spaced apart from a pressing portion 26 by groove 25, and a pre-pressure bolt 19a is screwed into the pressing portion 26 in order to impose a pre-pressure on said track portion 27 in a horizontal direction.

In place of the pre-pressure device consisting of said groove 25, pre-pressure bolt 19a, etc., by preparing in advance several sets of balls having different diameters (sets of balls differing in diameter in steps and in the order of several microns compared with the nominal ball diameter), and by replacing with balls having larger diameter in case a larger pre-pressure is required between said both tracks 4, 5a and the balls, it is possible to obtain the required pre-pressure.

The portion other than described above on the slide unit 2a of said embodiment as shown in FIG. 11 and FIG. 12 are same to those of the embodiment described previously.

Figure 13:
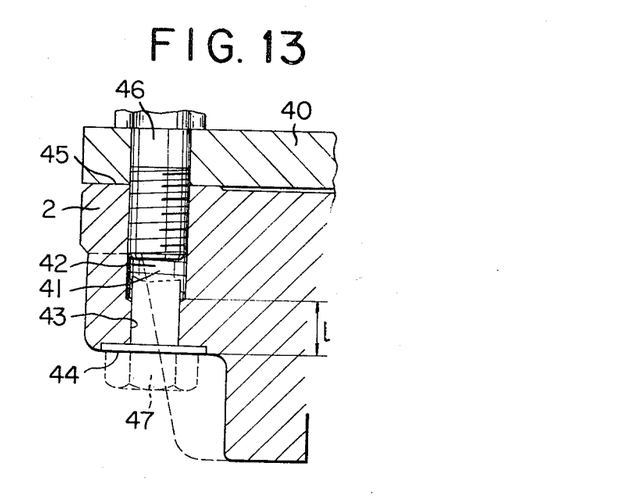
FIG. 13 is a partial cross sectional view of the mounting construction of the slide unit.

As shown in FIG. 13, attached body 40 is mounted on the slide unit 2 and is fastened by screws.

For the fastening by screws as described above, as shown in FIG. 1 and FIG. 2, at the positions shown by dotted lines a there are provided mounting holes 41 on the slide unit 2 as shown in FIG. 13. The mounting hole 41 is formed by a female thread 42 at its upper portion and is formed by a cylindrical guide surface 43 at its lower portion, and further, at its bottom surface there is formed a counterbored surface 44 which becomes a mounting regulating surface. Further, the upper surface of the slide unit 2 is formed to have a finished mounting surface 45 for the attached body 40.

As shown in FIG. 13, the length of the portion of said female thread 42 is of sufficient length for the fastening of the mounting bolt 46. Also said cylindrical guide surface 43, as shown in the drawing, is of sufficient length 1 to accurately and securely guide the mounting bolt 47 coming from the bottom. In the example shown in the drawing, the mounting bolt 46 has a larger diameter than that of mounting bolt 47, and thus, the mounting bolt 47 is inserted into the cylindrical guide surface 43 without making contact with the female thread 42.

Further, in the previously described embodiment, by separating the track plate 16 from the slide unit body 15, it became possible to grind the track surface 5 of the track plate 16 with high accuracy, and also, it became possible to directly press the back side of the track plate 16 by the pre-pressure bolt 19, and thus enabled to perform the pre-pressure operation easily.

The slide unit of ball bearing for linear motion of the present invention is a superior invention in that the respective locations of the track surfaces, direction changing paths, return holes, pre-pressure bolts, lubrication hole, and mounting holes are closely disposed without waste, resulting in the achievement of compactness of the slide unit, and further, in that, by making the mounting recess, where the track end retainer, side plate, and seal are fitted into the slide unit, to be of bear head contour, which is a shape of a combination of a large circle and two small circles, the machining process is greatly reduced, resulting in a large reduction of material cost and machining cost with accompanying compactness.

Further, in the case of those provided with a track plate having track surface which is separate from the slide unit body, it became possible to obtain a high accuracy of the grinding operation of the track surface, and thus provided superior effects on the slide unit from the standpoints of machining and maintenance.

Also, as described previously, the slide unit according to the present invention has a mounting hole in which the upper portion is formed with a female thread and the lower portion is formed with a cylindrical guide surface. Thus, the screw fastening of the attached body mounted on the slide unit can be made by a common mounting hole whether the mounting bolt is to be fastened from the top or from the bottom. This provides a mounting construction in which the attached body can be securely fastened at an accurate position in either case of top fastening or bottom fastening, and thus there is no need to provide a separate mounting hole for top fastening and bottom fastening on the slide unit, which aids in the compactness of the slide unit, and also, there is no need to manufacture and maintain two kinds of slide units, namely one having mounting holes for top fastening and one having mounting holes for bottom fastening, which aids to prevent increase of storing space and of manufacturing cost.

I claim:

1. A ball bearing slide unit for linear motion wherein said slide unit is mounted on a track rail of rectangular cross section having linear track surfaces symmetrically at both vertical side surfaces, said slide unit including a body provided with track surfaces opposing said track surfaces on said track rail, with linear return holes running parallel to said track surfaces, and with direction changing paths which connect both ends of said track surfaces and said return holes respectively, said body track surfaces, return holes and direction changing paths forming circulating paths where groups of balls endlessly circulate supporting a load and rolling between both track surfaces, track end retainers which make contact externally with both ends of the track surfaces of the track portion provided symmetrically at the channel shaped inner surfaces of the slide unit body and with both ends of the return holes and which form part of the direction changing paths which connect said track surfaces to said return holes, and side plates which make contact externally with said track end retainers and which form said direction changing paths together with said track end retainers, said track end retainers and said side plates being of large circular shape in general, and the portions providing the direction changing paths which connect to said return holes project outwardly in an upwardly inclined direction forming circular ear like shapes, and thus providing a bear head like contour, said track end retainers and said side plates being mounted in like shaped recesses in said body.

2. A ball bearing slide unit for linear motion as described in claim 1, characterized in that the track portions provided at the channel shaped inner surfaces of the slide unit body consist of a pair of track plates which are separate from the body, being formed with track surfaces and fitted into the body symmetrically at said inner surfaces with said track surfaces facing inward, and means including a plurality of spaced bolts exerting a pre-loading force on each of said track plates.

3. A ball bearing slide unit for linear motion wherein said slide unit is mounted on a track rail of rectangular cross section having linear track surfaces symmetrically at both vertical side surfaces, said slide unit including a body provided with track surfaces opposing said track surfaces on said track rail, with linear return holes running parallel to said track surfaces, and with direction changing paths which connect both ends of said track surfaces and said return holes respectively, said body track surfaces, return holes, and direction changing paths forming circulating paths where groups of balls endlessly circulate supporting a load and rolling between both track surfaces, track end retainers which make contact externally with both ends of the track surfaces of the track portion provided symmetrically at the channel shaped inner surfaces of the slide unit body and with both ends of the return holes and which form part of the direction changing paths which connect said track surfaces to said return holes, and side plates which make contact externally with said track end retainers and which form said direction changing paths together with said track end retainers, said track end retainers and said side plate being of large circular shape in general, and the portion providing the direction changing paths which connect to said return holes projecting outwardly in an upwardly inclined direction forming circular ear like shapes, and thus providing a bear head like contour, said track end retainers and said side plates being mounted in like shaped recesses in said body, and also in that a mounting hole drilled on the slide unit for fastening an attached body fixedly on said slide unit is formed with a female thread portion located at the upper part of the hole and is formed with a cylindrical guide surface located at the lower part of the hole with sufficient length to accurately and securely fit, guide and hold a mounting bolt from the bottom, and the top surface of the slide unit is finished for mounting and the bottom surface around the mounting hole is counterbored to be a regulating surface for mounting.

* * * * *